July 23, 1929.　　　C. F. LARZELERE　　　1,721,518

AUTOMATIC TIRE FILLING CONNECTION

Filed March 26, 1926

Inventor

Charles F. Larzelere

By Blackmore, Spencer & Flint

Attorneys

Patented July 23, 1929.

1,721,518

UNITED STATES PATENT OFFICE.

CHARLES F. LARZELERE, OF FLINT, MICHIGAN, ASSIGNOR TO GENERAL MOTORS CORPORATION, OF DETROIT, MICHIGAN, A CORPORATION OF DELAWARE.

AUTOMATIC TIRE-FILLING CONNECTION.

Application filed March 26, 1926. Serial No. 97,674.

My invention relates to couplings, and is more particularly directed to a terminal hose coupling adapted to engage with the valve stem of automobile tires, balloons, dirigibles and the like, for automatically filling the inflation chambers thereof with a requisite quota of inflating gas.

One of the objects of the invention is to provide a simple, compact and inexpensive pressure gauge coupling, convenient of manipulation, which automatically functions to cut off the supply of inflating fluid when a predetermined amount has passed therethrough into an inflation chamber. The device is so constructed that the pumping up of the inflation chamber beyond a dangerous point is automatically prevented, and a wide range of setting of the gauge is permitted.

Other objects will appear hereinafter.

In the drawing.

Like numerals of reference refer to corresponding parts throughout the several views.

Figure 1:
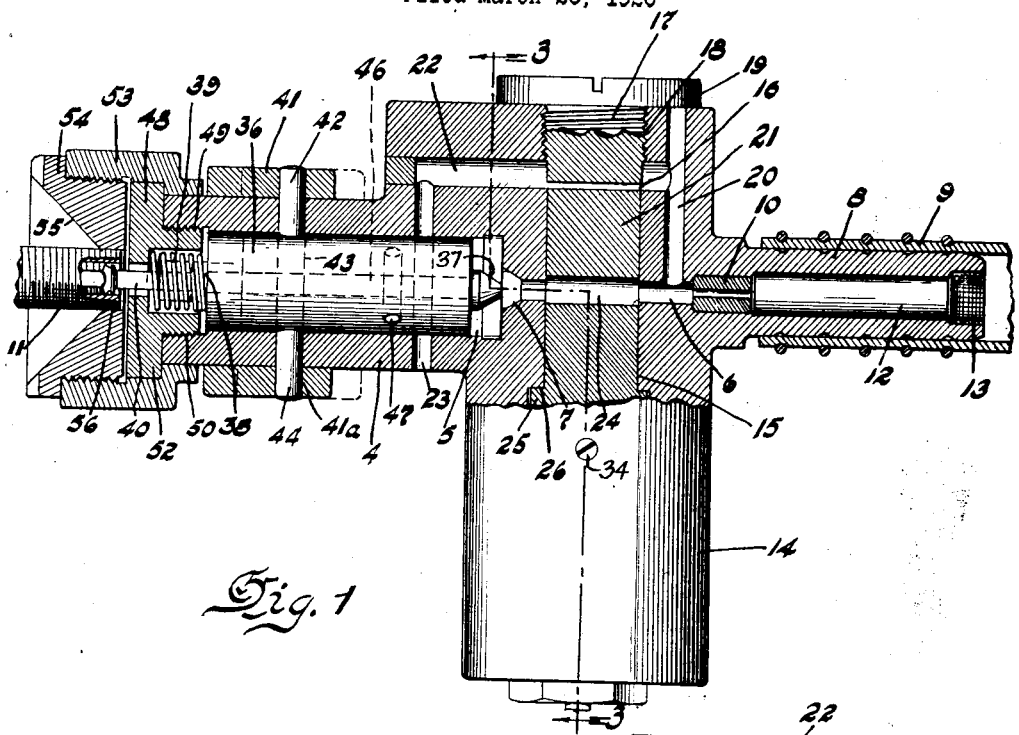
Figure 1 is a part sectional view of the coupling with the slidable cut off valve illustrated in full.

The invention comprises a casing 4 formed with a relatively wide axial chamber 5, and an adjoining inlet passage 6 connected therewith in a tapered bore 7, and an inlet nozzle 8 axially aligned with the passage 6 and adapted to be connected in the manner as illustrated in Figure 1 with a hose 9, the said nozzle including a nipple 10 for limiting the flow of fluid through the coupling according to the capacity of the inflating valve 11, a tubular passage 12 interposed between the nipple 10, and a strainer 13 housed within the outer end of the nozzle. The casing 4 is further provided with an extension 14 formed with a cross bore 15 extending across the passage 6 and adapted to house a spring pressed regulator for controlling the entrance to the inlet passage 6.

Adjacent one end of the cross bore 15 is formed a circular chamber 16 being conveniently closed by a screw plug 17 screwed into the threaded end 18 of the bore 15 and conveniently provided with a comparatively wide head 19 to substantially cover the side of the casing. A suitable branch 20 of the passage 6 affords communication therewith and the chamber 16 and supplies a fluid pressure to the piston 21 during the operation of the coupling. The branch 20 is further extended around the piston in ducts 22 and 23, diametrically across the casing for establishing communication with the chamber 5, and, as shown hereinafter at specified times, communication with the atmosphere.

Figures 2, 3:
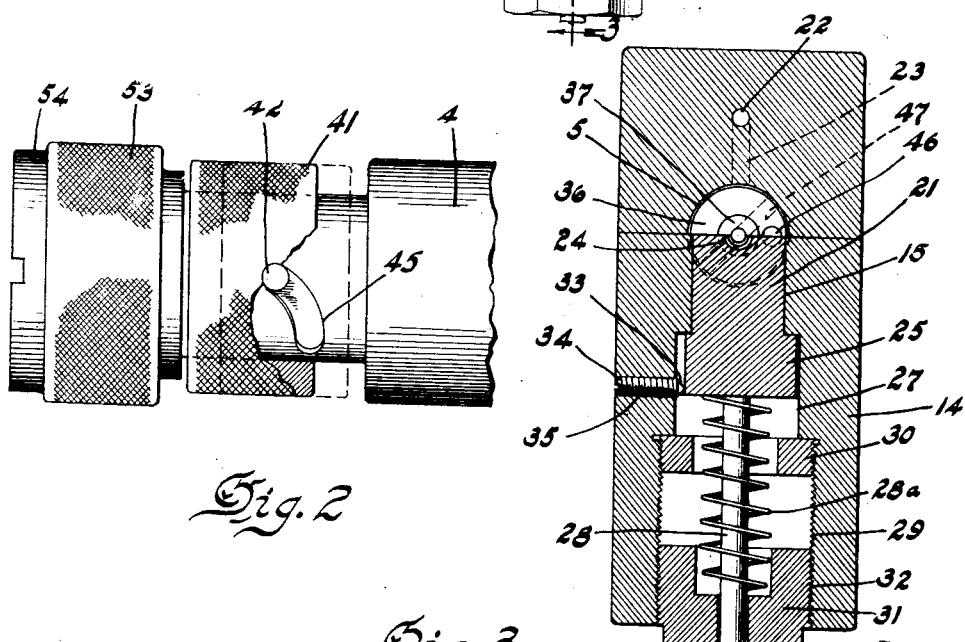
Figure 2 is a detail view illustrating the means employed for operating the cut off valve.
Figure 3 is a sectional view taken on the line 3—3 and looking in the direction indicated by the arrows, illustrating the details of construction of a spring pressed regulator constructed in accordance with my invention.

The said regulator includes a piston 21 provided with a port 24 which, as will be seen hereinafter, is arranged to register normally with the inlet passage 6, an abutment collar 25 adapted to bear against a shoulder 26 of the counter bore 27 formed in the bore 15, and a central stem 28 extending axially from the end of the collar 25. The outer end of the bore 15 is further counter bored and screw threaded, as indicated at 29 in Figure 2, to receive an exteriorly threaded annular ring 30 adapted to limit the outward movement of the piston 21 which, when the pressure in the chamber 16 has reached a certain pre-determined point, moves outward against the retractile force of the spring $28^a$ surrounding and carried on the said stem. The said spring is adjustably retained in position by a cup shaped bushing 31 formed with external screw threads 32 for engagement with the threaded counter bore 29, the bushing being formed with a central aperture to permit the passage of the stem therethrough whenever the piston 21 is actuated outwardly. On one side of the collar 25 is formed a suitable slot to engage the extended end 33 of a set screw 34 carried in the aperture 35 of the casing, whereby the port 24 is at all times maintained in parallel disposition with respect to the axis of the passage 6.

A cylindrical member or shaft 36 carried in the chamber 5 is fashioned preferably as illustrated in Figure 1 and provides a cut-off valve, an exhaust valve and an inflation valve opener. The shaft 36 preferably carries at its inner end a conical extension 37 arranged to engage the said tapered bore 7 for positively closing the passage 6; and there is further provided near the outer end of the shaft a reduced portion 38 which, as shown hereinafter, is adapted to carry the spring 39 for yieldingly urging the shaft 36 axially inwardly, said reduced portion 38 having a rod 40 extending axially therefrom, which, upon the movement of the shaft, is adapted to control the operation of the valve 11 fitted to the inflation chamber to be filled.

The shaft is given a mixed rotational and axial movement by means of a rotatable sleeve 41 which is arranged to actuate a pin 42 projecting from the aperture 43 formed transversely of the shaft and having its end portions 44 engaging diametrically opposite spiral slots 45 (see Figure 2) formed in the casing 4, the extreme ends of the pin 42 being headed over to lock the pin in position in the aperture 41ª of the said sleeve.

The shaft is further constructed with a radially disposed longitudinal passageway 46 for establishing communication from one end of the shaft to the other, and a transverse port 47 so arranged that upon a combined rotational and axial movement of the shaft, the port 47 will register with the duct 23 and exhaust any fluid in the chamber 16 which has been accumulated therein for controlling the piston 21 and for obstructing the passage 6. A plug 48 provided with exterior screw threads 49 adapted to engage the interior threaded surface of the counter bore 50 and constructed with a recess as illustrated in Figure 1 to receive one end of the said spring 39, serves to close the chamber 5; the plug, moreover, is adapted to secure over the outer end of the casing by means of its extended flange 52, the rotatable sleeve 53 which carries the tip 54 provided with a flared opening 55 and a threaded center 56 adapted to engage the threaded outer end of the said valve 11.

In operation, the tip 54 is attached to the stem of the valve 11, and with the shaft 36 in the position shown in Figure 1, the inflating medium passes freely through the passage 6, the port 24, into the chamber 5, along the longitudinal passage 46 of the said shaft, and into the recess of the bushing 48, thence along the surface of the rod 40 and into the valve 11, which is positively maintained open by said rod extending thereinto. Of course, as the inflation proceeds, the circular chamber 16 is filled with the inflating fluid, and a pressure arises therein corresponding to the pressure of the air within the tire, for, with the shaft 36 moved to its outward position, the transverse passage 47 does not register with the duct 23, and, it will be evident, communication between the chamber 16 and the atmosphere is cut off.

When the pressure within the tire reaches the predetermined degree as set by the adjustment of the spring 28ª, the corresponding pressure in the chamber 16 acts on top the piston 21 to force the piston downwardly and move the port 24 out of alinement with the passageway 6, thereby cutting off the air supply. After this occurs, the operator may rotate manually the sleeve 41, which, because of the cam slot 45, shifts the shaft 36 axially to seat the valve 37 and close the central passage and pulls the rod 40 away from the tire valve stem, allowing the tire valve to close. During this axial and rotary movement of the shaft 36 and at an intermediate point in its movement, the port 47 is momentarily brought into registry with the bypass ports 22 and 23 to exhaust the air in the chamber 16. Since this exhaust is only momentary and even though the piston valve is returned to its open position by the tension of the spring 28ª, the pressure will immediately build up in in chamber 16 to again close and hold the piston valve in closed position. Until the device is once more applied to the tire, valves 37 and 21 remain closed, and to allow air flow, it is necessary for the operator to manipulate the sleeve 41 to unseat the valve 37 and bring the port 47 into registry with the relief port 23 to relieve pressure in the chamber 16 and allow the spring 28ª to move the piston until its passageway 24 is in alinement with the passageway 6. The continued movement of the sleeve turns the port 47 out of registry with the relief port and at the same time positively opens the tire valve. At this time, a supply of air will be free to flow directly through the center of the valve body into the tire until the pressure again builds up behind the piston valve to automatically cut off the supply.

Thus it will be seen that I have provided a simple device which automatically operates to distribute the correct quantity of inflation fluid to an inflation chamber and by a simple manual operation, the device is quickly adapted for further continued use. It will be understood that the operation of filling the inflation chambers may be repeated indefinitely. Moreover, means is provided to positively maintain the valve of the inflation chamber open during the filling operation.

From the foregoing it will be seen that I have provided a combination, construction and arrangement of parts in a simple and inexpensive manner which attains the objects hereinbefore set out.

Modifications of the above may be made within the spirit and scope of the invention.

What I claim is:

1. A pressure regulating device for filling inflation chambers, including a casing provided with inlet and outlet passages, a fluid pressure actuated cut-off valve adapted to close communication between said passages, and manually actuated means adapted upon a partial manipulation to relieve the pressure on said valve and permit return thereof to open position and upon further manipulation to close communication between the passages.

2. A pressure regulating device for filling inflation chambers, including a casing having a passageway for fluid under pressure extending therethrough, a pressure actuated valve member adapted to close the passageway against the flow of fluid when the pressure in the chamber to be inflated attains a predetermined value, and a manually operable member arranged to relieve the pressure on said valve member and close said passageway against passage of fluid independently of the pressure actuated valve member.

3. A pressure regulating device for filling inflation chambers, including a casing provided with inlet and outlet passages, a pressure actuated member having an opening therein which is adapted to register with said passages to establish communication therebetween, a pressure chamber for said member communicating with one of said passages whereby when the fluid under pressure attains a predetermined value said member is actuated to move the opening therein out of registry with said passages to automatically close communication therebetween, and a manually operable member adapted upon operation to open said pressure chamber to atmosphere and relieve the pressure therein.

4. A pressure regulating device for filling inflation chambers, including a casing provided with inlet and outlet passages, a pressure actuated member having an opening therein which is adapted to register with said passages to establish communication therebetween, a pressure chamber for said member communicating with one of said passages whereby when the fluid under pressure attains a predetermined value said member is actuated to move the opening therein out of registry with said passages to automatically close communication therebetween, and a manually operable valve member which upon partial movement in one direction opens said pressure chamber to atmosphere and upon further movement again closes said chamber and also closes said passages against the flow of fluid, independently of said pressure actuated member.

5. A pressure regulating device for filling inflation chambers, including a casing having a passageway therethrough, a pressure actuated cut-off member adapted to shut off the flow of fluid under pressure through said passageway when the pressure attains a predetermined value, a manually operable axially movable member having a portion at one end which is adapted to close said passageway against the flow of fluid therethrough when said member is at one limit of its movement, said member also being adapted for the relief of pressure on said cut-off member when it is at an intermediate point in its range of movement.

In testimony whereof I affix my signature.

CHARLES F. LARZELERE.